(12) United States Patent
Benz et al.

(10) Patent No.: US 6,747,258 B2
(45) Date of Patent: Jun. 8, 2004

(54) INTENSIFIED HYBRID SOLID-STATE SENSOR WITH AN INSULATING LAYER

(75) Inventors: Rudolph G. Benz, Daleville, VA (US); Nils L Thomas, Roanoke, VA (US); Arlynn W. Smith, Blue Rdge, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 89 days.

(21) Appl. No.: 09/973,907

(22) Filed: Oct. 9, 2001

(65) Prior Publication Data

US 2003/0066951 A1 Apr. 10, 2003

(51) Int. Cl.[7] .......................... H01J 31/50; H01J 40/14; H04N 5/30
(52) U.S. Cl. ............................. 250/207; 250/214 VT; 313/103 CM; 348/217.1
(58) Field of Search ............................ 250/208.1, 207, 250/214 VT, 370.09, 370.11, 372, 374; 313/103 CM, 105 CM, 105 R; 348/216.1, 217.1

(56) References Cited

U.S. PATENT DOCUMENTS

| | | |
|---|---|---|
| 4,355,229 A | 10/1982 | Zimmerman et al. |
| 4,395,636 A | 7/1983 | Anger et al. |
| 4,471,378 A | 9/1984 | Ng |
| 4,555,731 A | 11/1985 | Zinchuk |
| 4,796,090 A | 1/1989 | Fraier .......................... 358/211 |
| 4,974,090 A * | 11/1990 | Kawamura et al. .......... 358/217 |
| 4,980,772 A * | 12/1990 | Kawamura et al. .......... 358/217 |
| 5,029,963 A | 7/1991 | Naselli et al. ............. 350/96.18 |
| 5,084,780 A | 1/1992 | Phillips ....................... 359/350 |
| 5,099,128 A | 3/1992 | Stettner |
| 5,218,194 A | 6/1993 | Garbi et al. ................. 250/214 |
| 5,349,177 A | 9/1994 | Thomas et al. .............. 250/214 |
| 5,665,959 A | 9/1997 | Fossum et al. ........... 250/208.1 |
| 6,069,352 A | 5/2000 | Castracane et al. ......... 250/214 |
| 6,072,565 A | 6/2000 | Porter ........................ 356/5.04 |
| 6,271,511 B1 | 8/2001 | Pierle .......................... 250/214 |
| 6,278,104 B1 | 8/2001 | Saldana et al. .............. 250/214 |
| 6,285,018 B1 | 9/2001 | Aebi et al. ................ 250/214.1 |
| 6,303,918 B1 | 10/2001 | Estrera et al. |
| 6,333,205 B1 * | 12/2001 | Rhodes ......................... 438/69 |

FOREIGN PATENT DOCUMENTS

| | | |
|---|---|---|
| DE | 42 37 097 A1 | 5/1993 |
| DE | 199 27 694 C1 | 11/2000 |
| EP | 0 053 530 A1 | 6/1982 |
| EP | 1 048 939 A1 | 11/2000 |
| EP | 1 120 812 A2 | 8/2001 |
| WO | WO 01/71381 A2 A3 | 9/2001 |

OTHER PUBLICATIONS

International Search Report, International Application No. PCT/US02/32101, dated Sep. 10, 2002.

* cited by examiner

*Primary Examiner*—Stephone B. Allen
(74) *Attorney, Agent, or Firm*—RatnerPrestia (57) ABSTRACT

An intensified hybrid solid-state sensor includes an imaging device comprising a solid-state sensor assembled with an image intensifier cathode, microchannel plate (MCP), and body envelope. This device combines the best functions of the image intensifier, good signal-to-noise ratio and high logarithmic gain, with the electronic read-out functions either of a Complementary Metal Oxide Semiconductor (CMOS) or charged coupled device (CCD). Applications for this invention are primarily night vision systems where good low light sensitivity and high gain are required.

20 Claims, 8 Drawing Sheets

(PRIOR ART)

INTENSIFIED HYBRID SOLID-STATE SENSOR WITH AN INSULATING LAYER

FIELD OF THE INVENTION

The present invention is directed to an intensified hybrid solid-state sensor. More particularly, the present invention relates to an image intensifier using a CMOS or CCD sensing device connected in close physical proximity to a microchannel plate (MCP) and photo cathode.

BACKGROUND OF THE INVENTION

The present invention relates to the field of image intensifying devices using solid-state sensors, such as a CMOS or CCD device. Image intensifier devices are used to amplify low intensity light or convert non-visible light into readily viewable images. Image intensifier devices are particularly useful for providing images from infrared light and have many industrial and military applications. For example, image intensifier tubes are used for enhancing the night vision of aviators, for photographing astronomical bodies and for providing night vision to sufferers of retinitis pigmentosa (night blindness).

There are three types of known image intensifying devices in prior art; image intensifier tubes for cameras, all solid-state CMOS and CCD sensors, and hybrid EBCCD/CMOS (Electronic Bombarded CCD or CMOS sensor).

Figure 1:
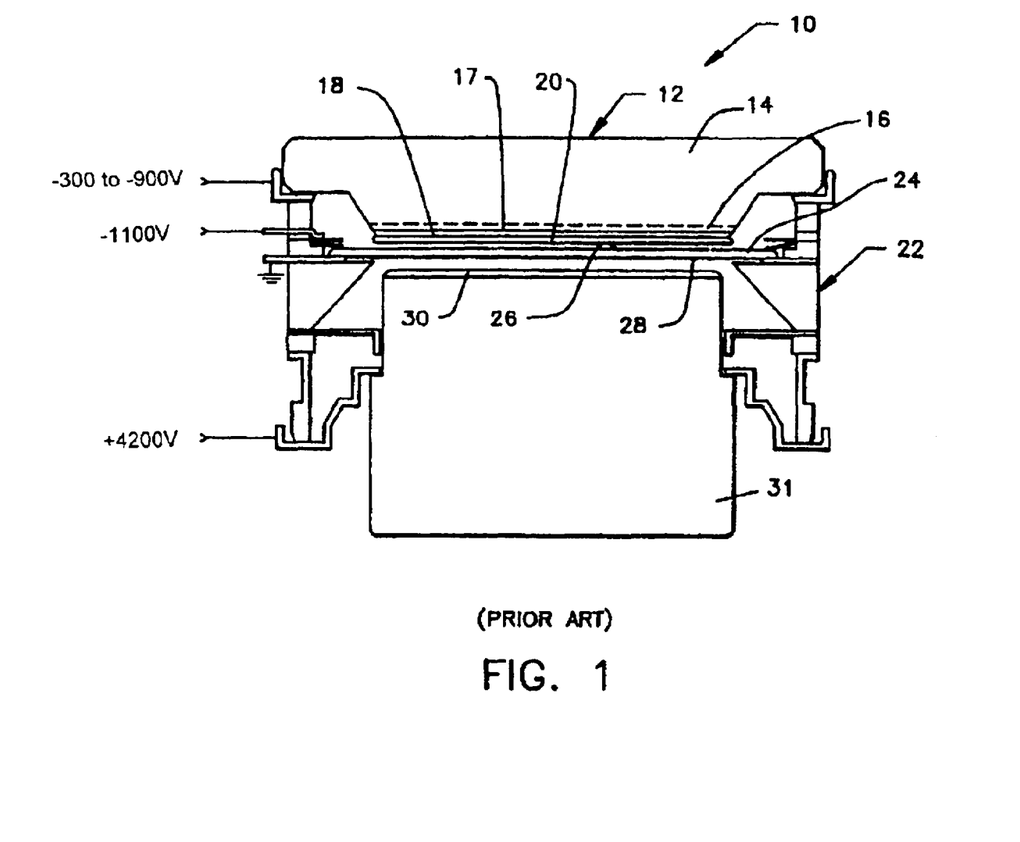
FIG. 1 is a schematic illustration of a typical image intensifying tube.

Image intensifier tubes are well known and used throughout many industries. Referring to FIG. 1, a current state of the prior art Generation III (GEN III) image intensifier tube 10 is shown. Examples of the use of such a GEN III image intensifier tube in the prior art are exemplified in U.S. Pat. No. 5,029,963 to Naselli, et al., entitled REPLACEMENT DEVICE FOR A DRIVER'S VIEWER and U.S. Pat. No. 5,084,780 to Phillips, entitled TELESCOPIC SIGHT FOR DAYLIGHT VIEWING. The GEN III image intensifier tube 10 shown, and in both cited references, is of the type currently manufactured by ITT Corporation, the assignee herein. In the intensifier tube 10 shown in FIG. 1, infrared energy impinges upon a photo cathode 12. The photo cathode 12 is comprised of a glass faceplate 14 coated on one side with an antireflection layer 16, a gallium aluminum arsenide (GaAlAs) window layer 17 and gallium arsenide (GaAs) active layer 18. Infrared energy is absorbed in GaAs active layer 18 thereby resulting in the generation of electron/hole pairs. The produced electrons are then emitted into the vacuum housing 22 through a negative electron affinity (NEA) coating 20 present on the GaAs active layer 18.

A microchannel plate (MCP) 24 is positioned within the vacuum housing 22, adjacent the NEA coating 20 of the photo cathode 12. Conventionally, the MCP 24 is made of glass having a conductive input surface 26 and a conductive output surface 28. Once electrons exit the photo cathode 12, the electrons are accelerated toward the input surface 26 of the MCP 24 by a difference in potential between the input surface 26 and the photo cathode 12 of approximately 300 to 900 volts. As the electrons bombard the input surface 26 of the MCP 24, secondary electrons are generated within the MCP 24. The MCP 24 may generate several hundred electrons for each electron entering the input surface 26. The MCP 24 is subjected to a difference in potential between the input surface 26 and the output surface 28, which is typically about 1100 volts, whereby the potential difference enables electron multiplication.

As the multiplied electrons exit the MCP 24, the electrons are accelerated through the vacuum housing 22 toward the phosphor screen 30 by the difference in potential between the phosphor screen 30 and the output surface 28 of approximately 4200 volts. As the electrons impinge upon the phosphor screen 30, many photons are produced per electron. The photons create the output image for the image intensifier tube 10 on the output surface 28 of the optical inverter element 31.

Image intensifiers such as those illustrated in FIG. 1 have advantages over other forms of image intensifiers. First, intensifiers have a logarithmic gain curve. That is, the gain decreases as the input light level is increased. This matches the human eye response particularly when bright lights are in the same scene as low lights. Most solid-state devices have a linear response; i.e., the brighter the light the brighter the output signal. The result is that bright lights appear much brighter to a viewer of a solid-state system and tend to wash out the scene. Solid-state sensors can be modified to produce a gain decrease as input light is increased, however, this requires changing the amplifier gain, using shuttering, or using anti-blooming control.

Another advantage of image intensifiers is the ability to function over a large range of input light levels. The power supply can control the cathode voltage and thereby change the tube gain to fit the scene. Thus tubes can function from overcast starlight to daytime conditions.

However, image intensifier/$I^2$ cameras suffer from numerous disadvantages. The electron optics of the phosphor screen produces a low contrast image. This results in the object looking fuzzier to the human observer, or solid-state sensor, when viewed through an image intensifier. Although this deficiency has been somewhat reduced with further image intensifier development, solid-state imagers generally have better performance.

Another disadvantage with image intensifier/$I^2$ cameras is "halo." Halo results from electrons being reflected off either the MCP or the screen. The reflected electrons are then amplified and converted into light in the form of a ring around the original image. In image tubes, the halo from electrons reflected from the MCP has been reduced to a negligible effect for the most recent production tubes. However, the halo from the screen section still exists, although not to the degree of the cathode halo. Nevertheless, the screen halo is still a significant defect in imaging systems when a CCD or CMOS array is coupled to the image intensifier. This is because these arrays are more sensitive than the eye to the low light levels in the screen halo.

Another disadvantage is that image intensifiers do not have a method of providing electronic read-out. Electronic read-out is desired so that imagery from thermal sensors may be combined with intensified imagery with the result that the information from both spectra will be viewed at the same time. One solution has been to create an $I^2$ camera by coupling a CCD or CMOS array to an image intensifier tube. When a solid-state device is coupled to an image tube the resultant camera has all performance defects of the image tube that is low contrast, often poor limiting resolution due to coupling inefficiencies and the added cost of the image tube to the camera.

Figure 2A:
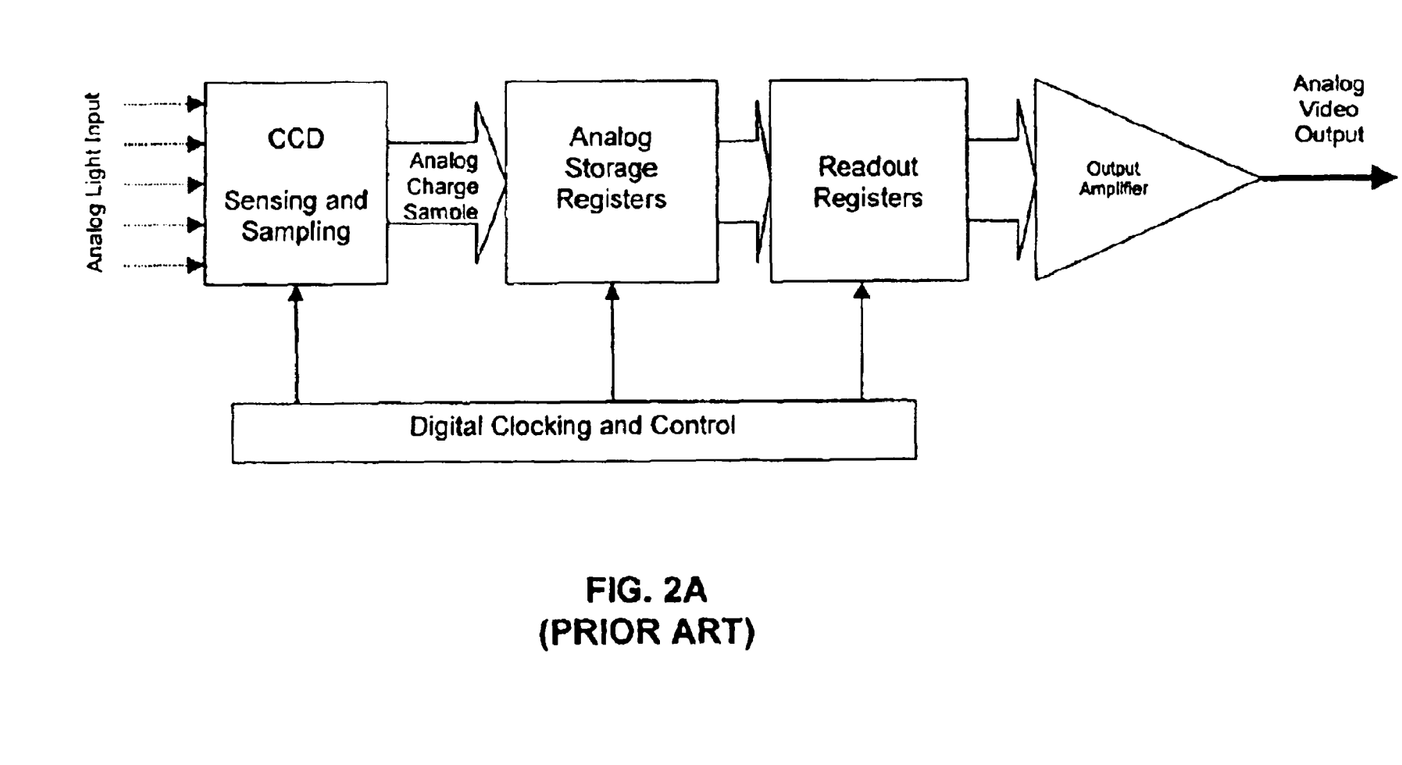
FIG. 2A is flow chart for a typical CCD sensor.
Figure 2B:
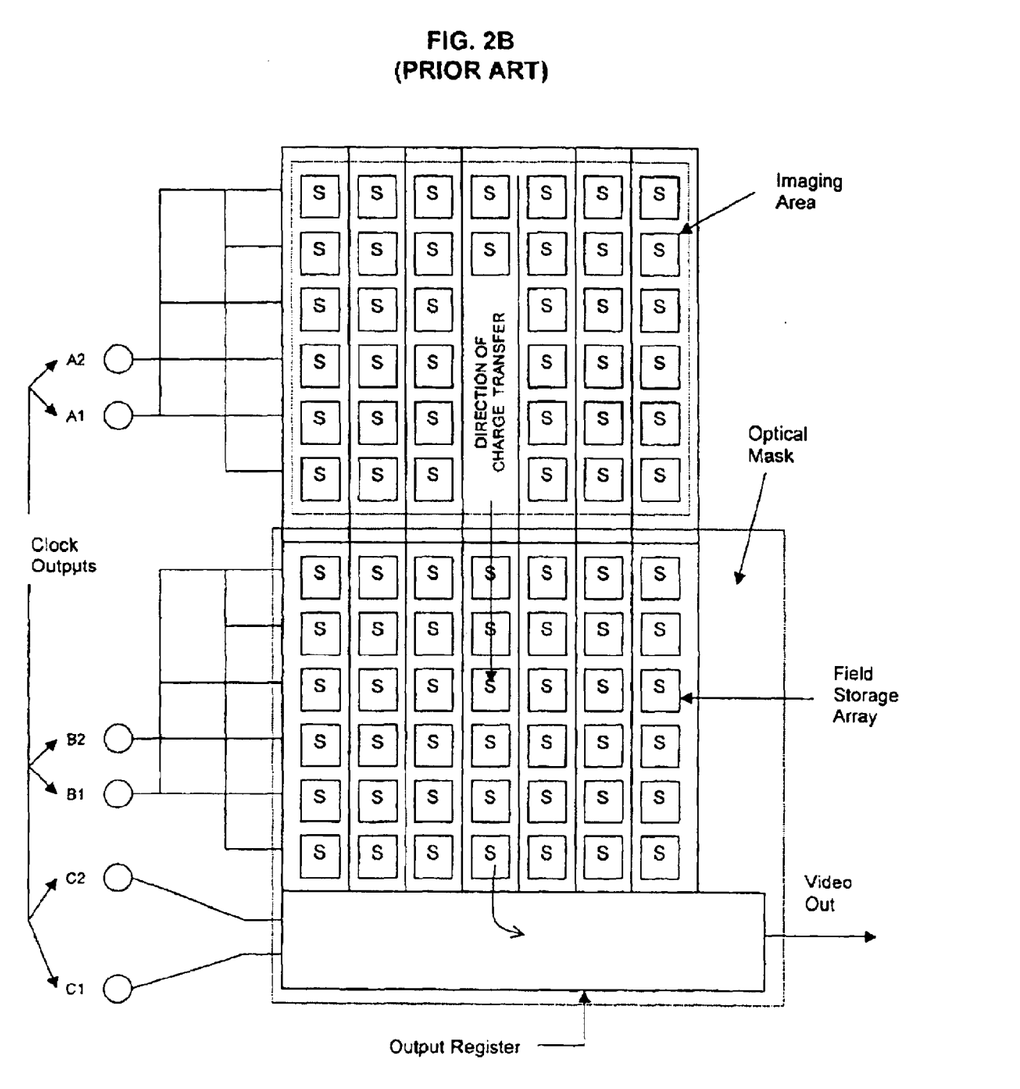
FIG. 2B is a schematic diagram of a typical CCD imaging surface.

Solid-state devices typically include CCD or CMOS sensors. They function by directly detecting the light, electronically transferring the signal to solid-state amplifiers, then displaying the image on either a television type tube or display such as a liquid crystal display. FIGS. 2a and 2b illustrate a flow chart and schematic diagram for a typical CCD sensor.

CCD and CMOS sensors are solid-state devices; that is, there is no vacuum envelope and the output is an electronic signal that must be displayed elsewhere and not within the sensor. The solid-state devices operate with power of 5–15 volts. The light is detected in individual pixels as labeled "s" and translated into electrons that are stored in the pixel until the pixel is read out to the storage register. From the storage register the electronic information contained in multiple pixels is then transferred to a read out register and then to output amplifiers and then to a video display device such as a cathode ray tube.

The disadvantages of an all solid-state device are poor low light level performance, potential blooming from bright light sources, poor limiting resolution, and high power consumption. The poor low light performance is due to dark current and read-out noise resulting in low signal-noise ratios. If a signal gain mechanism were provided prior to read-out this issue would be negated, as sufficient signal would exist to overcome the noise sources. Solid-state device architectures usually do not permit an amplification section prior to read-out. The poor limiting resolution is due to large pixel sizes usually chosen in an attempt to collect a large signal and thereby increase the signal to noise ration. These disadvantages have effectively prevented the use of solid-state sensors in night vision applications. The advantages of solid-state devices are better image contrast as compared to the image intensifier/$I^2$ camera, the availability of electronic read-out, and lower cost, particularly when the solid-state sensor is a CMOS array.

Figure 3:
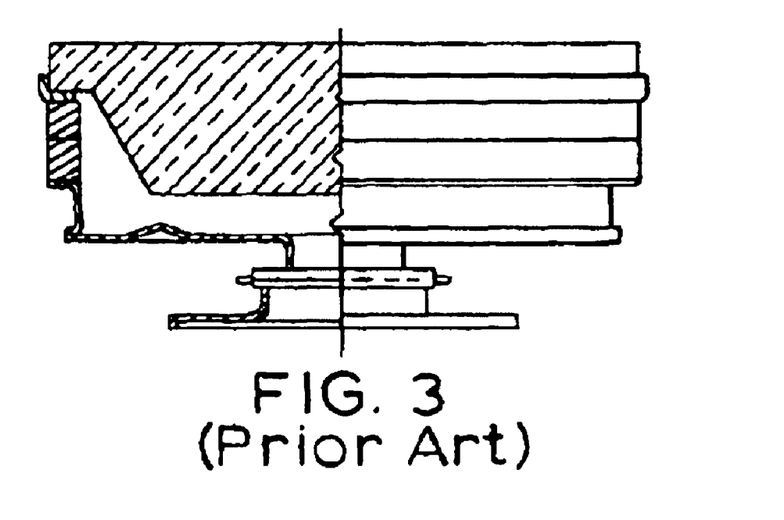
FIG. 3 is a cross-sectional view of a typical Electron Bombarded CCD device.

As can be seen, the strengths and weaknesses of image intensifiers and solid-state sensors compliment each other and theoretically a combination of both devices would give better performance. One such combination proposed as an alternative to image intensifiers/$I^2$ cameras and solid-state sensors, is the electron bombarded CCD/CMOS sensor (EBCCD/CMOS). This device consists of the photo-cathode and body envelope of the image tube, and either a CCD or CMOS sensor integrated into this envelope. An illustrative example of an EBCCD/CMOS sensor is shown in FIG. 3. A high voltage is applied between the cathode and solid-state sensor so that the resulting electrons are amplified within the silicon in the solid-state sensor by electron bombardment.

The advantages of the EBCCD/CMOS device are that it provides electronic readout. But the disadvantages are numerous. First, the intra-scene dynamic range is compressed. This means that overall contrast within the scene, when bright objects are next to dark objects, is reduced compared to an image intensifier/$I^2$ camera and all solid-state device. Secondly, the sensor suffers "halo" degradation of the image around bright lights due to electrons reflected off of the solid-state sensor. This halo exists in regular image tubes; however, technological improvements have reduced the halo to the point of non-existence. Thirdly, the very high voltage required to operate the device (2–10 kV) damages the silicon surface causing decay in performance over time.

Therefore, it is an object of the present invention to provide an intensified hybrid solid-state sensor that combines the functions of the image intensifier, good signal-to-noise ratio and high logarithmic gain, with the electronic read-out functions either of a complementary Metal Oxide Semiconductor (CMOS) or charged coupled device (CCD).

SUMMARY OF THE INVENTION

The present invention provides an intensified hybrid solid-state sensor. The solid-state sensor, according to the present invention, includes an imaging device comprising a solid-state sensor assembled with an image intensifier cathode, microchannel plate (MCP), and body envelope. This device combines the best functions of the image intensifier, good signal-to-noise ratio and high logarithmic gain, with the electronic read-out functions either of a complementary Metal Oxide Semiconductor (CMOS) or charged coupled device (CCD). Applications for this invention are primarily night vision systems where good low light sensitivity and high gain are required.

BRIEF DESCRIPTION OF THE DRAWINGS

In order that the invention will become more clearly understood it will be disclosed in greater detail with reference to the accompanying drawings, in which.

DESCRIPTION OF THE PREFERRED EMBODIMENT

Figure 4A:
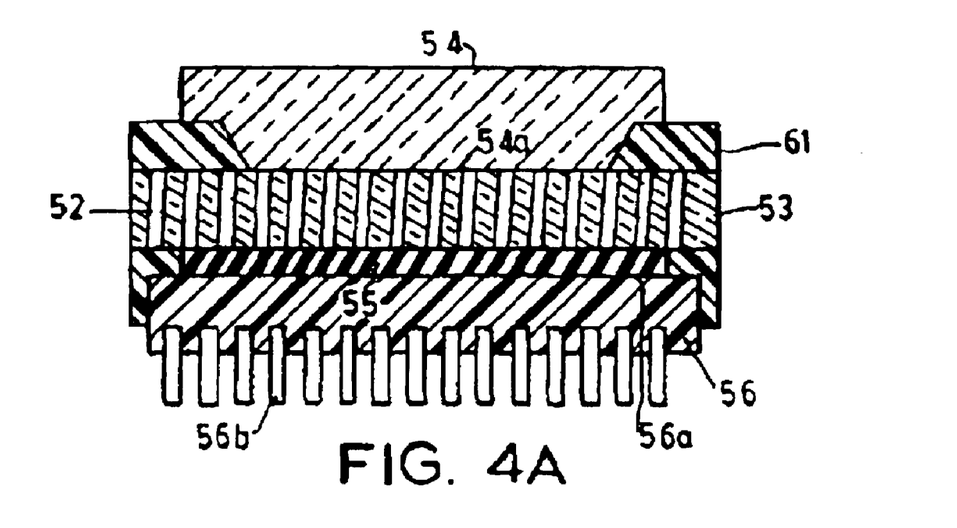
FIG. 4A is a cross-sectional view of an intensified hybrid solid-state sensor according to the present invention.
Figure 4B:
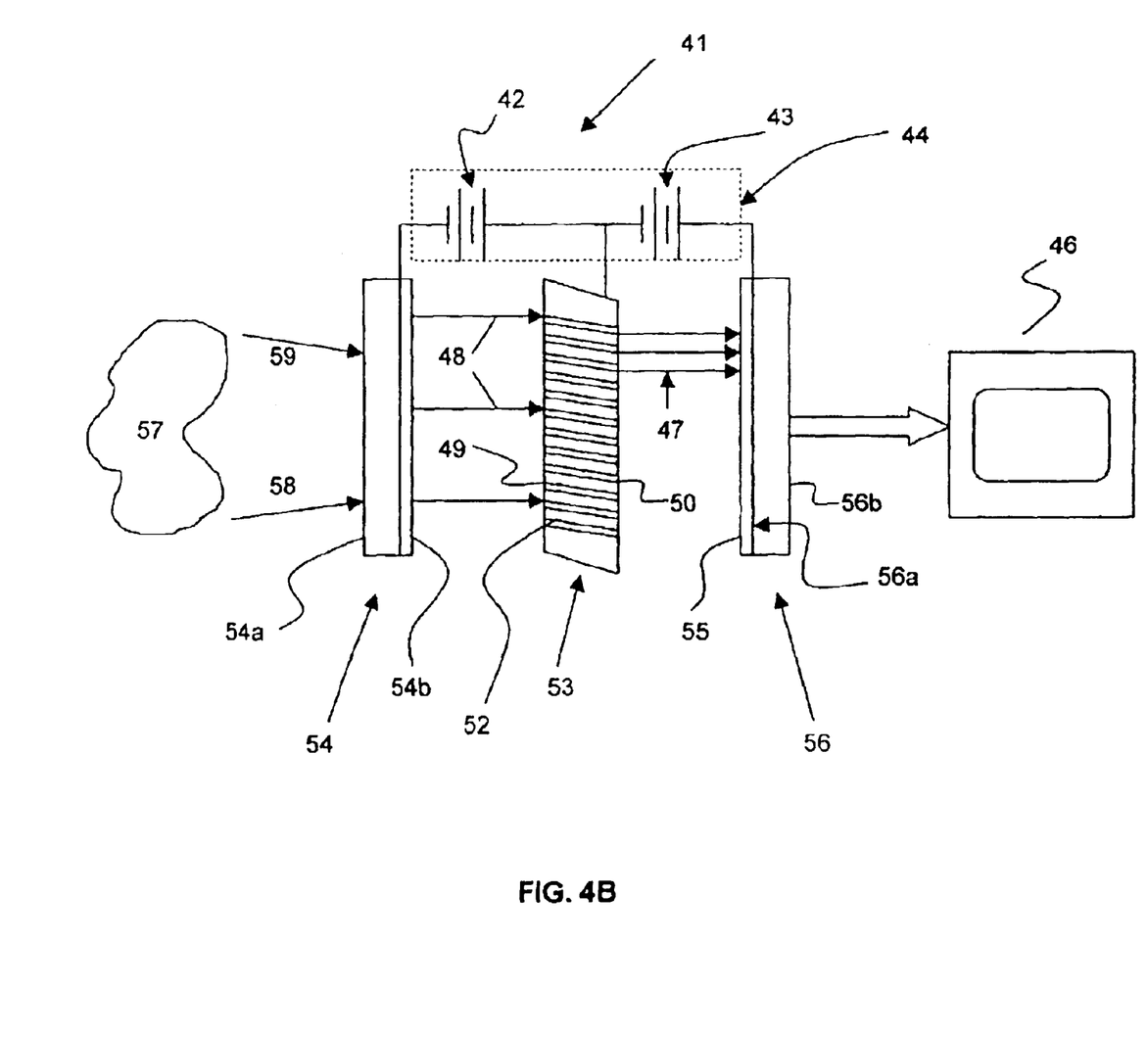
FIG. 4B is a schematic representation of an intensified hybrid solid-state sensor according to the present invention.
Figure 5A:
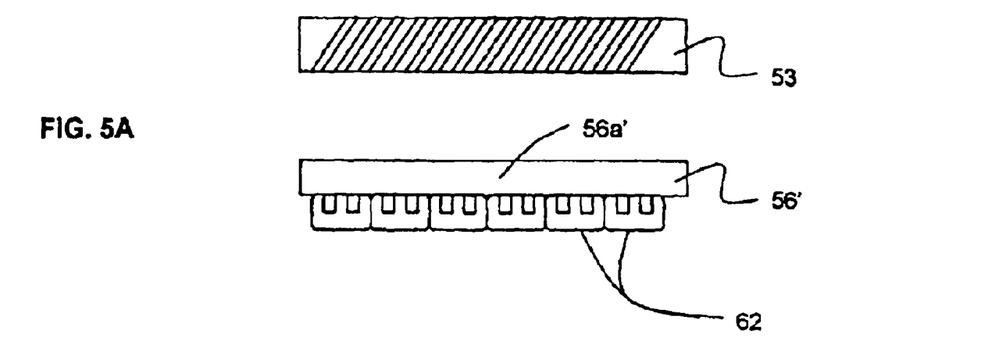
FIG. 5A is a schematic illustration of a microchannel plate (MCP) and a back thinned CCD for use in the present invention.
Figure 5B:
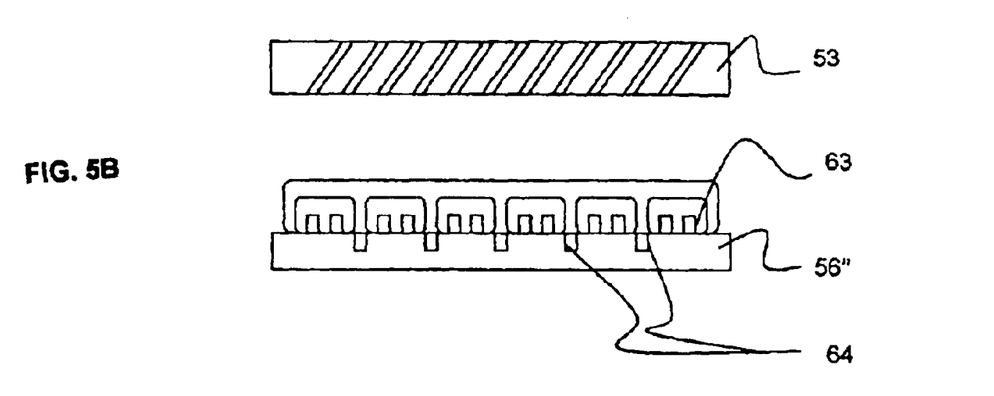
FIG. 5B is a schematic illustration of a microchannel plate (MCP) and a standard CCD for use in the present invention.
Figure 5C:
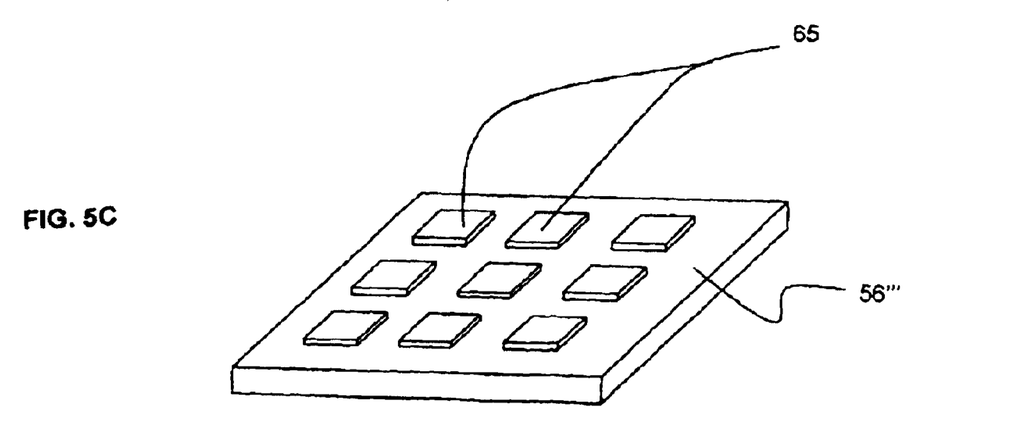
FIG. 5C is a perspective view of a CMOS-type image sensor for use with the present invention.

FIG. 4B is a schematic representation of an intensified hybrid solid-state sensor device 41 according to the present invention. Sensor 41 comprises a standard image tube photo cathode 54, a microchannel plate (MCP) 53 and a solid-state imaging sensor 56. Solid-state imaging sensor 56 can be any type of solid-state imaging sensor. Preferably, solid-state imaging sensor 56 is a CCD device. More preferably, solid-state imaging sensor 56 is a CMOS imaging sensor. FIG. 5A illustrates a back-thinned CCD imaging device as imaging sensor 56'. In this embodiment, MCP 53 is connected with a back thinned CCD sensor 56'. Back-thinned CCD 56' includes an electron receiving surface, such as diffusion collection area 56a' and a readout area 62. FIG. 5B illustrates an alternative standard CCD imaging device including MCP 53 connected to a standard CCD 56". CCD 56" includes an oxide cover 63 and plurality of collection wells 64. FIG. 5C illustrates sensor 56 as a CMOS sensor, including a CMOS substrate 56''' and a plurality of collection wells 65.

For various reasons, CCD based image sensors are limited or impractical for use in many applications. First, CCDs require at least two polysilicon layers with a buried-channel implant to-achieve their high performance, meaning that they cannot be fabricated using standard CMOS fabrication processes. Second, the level of integration that can be achieved with CCD based imagers is low since they cannot include the devices necessary to integrate them with other devices in an application. Finally, the circuits used to transfer data out of the image array to other devices on the system board, such as Digital Signal Processors (DSPs) and other image processing circuits, have a large capacitance and require voltages higher than the other circuits. Since the currents associated with charging and discharging these capacitors are usually significant, a CCD imager is not particularly well suited for portable or battery operated applications.

As such, less expensive image sensors fabricated out of integrated circuits using standard CMOS processes are desirable. Essentially, with a CMOS type imager sensor, a photo diode, phototransistor or other similar device is employed as a light-detecting element. The output of the light-detecting element is an analog signal whose magnitude is approximately proportional to the amount of light received by the element. CMOS imagers are preferred in some applications since they use less power, have lower fabrication costs and offer higher system integration compared to imagers made with CCD processes. Moreover, CMOS imagers have the added advantages that they can be manufactured using processes similar to those commonly used to manufacture logic transistors. While the preferred embodiment of the invention incorporates a CMOS sensor as the imaging sensor 56, any solid-state imaging sensor would work and is within the scope of this patent.

Figure 6A:
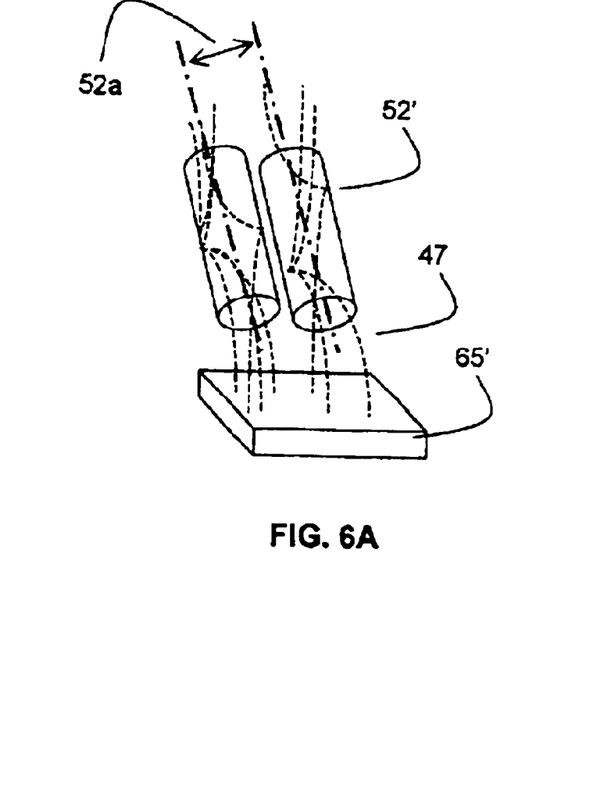
FIG. 6A is a perspective view of MCP channels having round profiles and a CMOS well.

Referring again to FIG. 4B, photo cathode 54 can be a standard photo cathode as used in any known type of image intensifying device. Photo cathode 54 can be, but is not limited to, a material such a GaAs, Bialkali, InGaAs, and the like. Photo cathode 54 includes an input side 54a and an output side 54b. MCP 53 can be, but is not limited to a silicon or glass material, and is preferably about 10 to 25 mm thick. MCP 53 has a plurality of channels 52 formed between an input surface 49 and output surface 50. Channels 52 can have any type of profile, for example a round profile 52' (FIG. 6A) or a square profile 52" (FIG. 6A.) MCP 53 is connected to electron receiving surface 56a of imaging sensor 56.

Preferably, output surface 50 of MCP 53 is physically in contact with electron receiving surface 56a of imaging sensor 56. However, insulation may be necessary between MCP 53 and imaging sensor 56. Accordingly, a thin insulating spacer 55 may be inserted between output surface 50 of MCP 53 and electron receiving surface 56a of imaging sensor 56. Insulating spacer 55 can be made of any electrical insulating material and is preferably formed as a thin layer, no more than several microns thick, deposited over electron receiving surface 56a of imaging sensor 56. For example, insulating spacer may be, but is not limited to, an approximately 10 μm thick film Alternatively, insulating spacer 55 could be a film formed on the output surface 50 of MCP 53 (not shown).

CMOS imaging sensor 56 includes electron receiving surface 56a and output 56b. The increased number of electrons 48 emitted from MCP 53 strike electron receiving surface 56a. Electron receiving surface 56a comprises a CMOS substrate 56''' and a plurality of collection wells 65 (FIG. 5C). Electrons 48 (See FIG. 4B) collected in collection wells 65 are processed using standard signal processing equipment for CMOS sensors to produce an intensified image signal that is sent through output 56b to an image display device 46.

An electric biasing circuit 44 provides a biasing current to sensor 41. Electric biasing circuit 44 includes a first electrical connection 42 and a second electrical connection 43. First electrical connection 42 provides a biasing voltage between photo cathode 54 and MCP 53. The biasing voltage from first electrical connection 42 is preferably set so as to be less than the biasing voltage than the EBCCD/CMOS sensor cathode to CCD voltage, i.e., 2–10 kV. For example, one preferred biasing voltage could be similar to that of image tubes, such as ~1400V. Second electrical connection 43 applies a biasing voltage of between MCP 53 and CMOS sensor 56. Preferably, the biasing voltage applied through second electrical connection 43 is significantly less than the image tube—screen voltage of about 4200V of the prior art devices (FIG. 1). For example, the biasing voltage applied through second electrical connection 43 could be, but is not limited to ~100V. FIG. 4A illustrates one potential configuration of the sensor 41. In this configuration, photo cathode 54, MCP 53, and imaging sensor 56 are maintained in a vacuum body or envelope 61 as a single unit, in close physical proximity to each other.

Referring to FIG. 4B, in operation, light 58, 59 from an image 57 enters intensified hybrid solid-state sensor 41 through input side 54a of photo cathode 54. Photo cathode 54 changes the entering light into electrons 48, which are output from output side 54b of photo cathode 54. Electrons 48 exiting photo cathode 54 enter channels 52 through input surface 49 of MCP 53. After electrons 48 bombard input surface 49 of MCP 53, secondary electrons are generated within the plurality of channels 52 of MCP 53. MCP 53 may generate several hundred electrons in each of channels 52 for each electron entering through input surface 49. Thus, the number of electrons 47 exiting channels 52 is significantly greater than the number of electrons 48 that entered channels 52. The intensified number of electrons 47 exit channels 52 through output side 50 of MCP 53, and strike electron receiving surface 56a of CMOS imaging device 56.

Figure 6B:
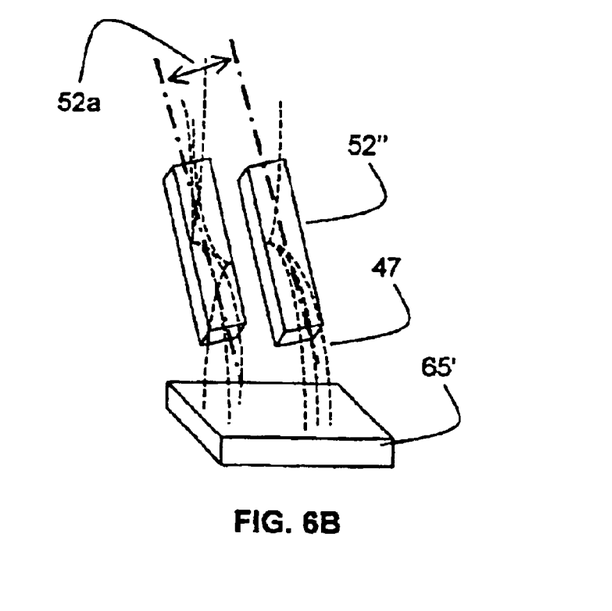
FIG. 6B is a perspective view of MCP channels having square profiles and a CMOS well.

FIG. 6 illustrates how the increased number of electrons 47 exit channels 52 and strike a particular collection well 65' of CMOS imaging sensor 56. As can be seen from this illustration, a relationship exists between the collection wells 65' and the number of channels 52 which emit electrons 47. In general, adjacent channels 52 of MCP 53 are separated by a predetermined channel pitch 52a. FIG. 6 illustrates a channel pitch 52a that results in more than one channel 52 per collection well 65'.

Figure 7A:
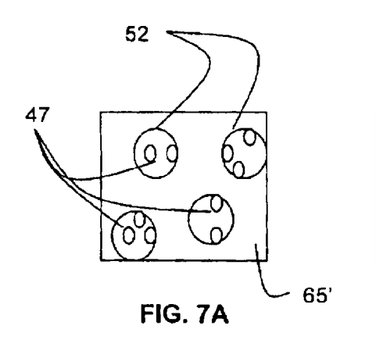
FIG. 7A is a schematic top view of a large pixel/small MCP channel pitch per unit area of the sensor surface according to the present invention.
Figure 7B:
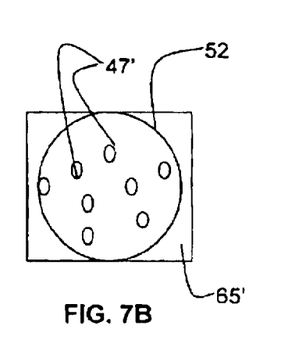
FIG. 7B is a schematic top view of a one-to-one pixel to MCP channel per unit area of the sensor surface according to the present invention
Figure 7C:
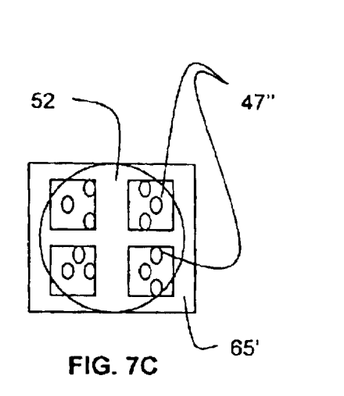
FIG. 7C is a schematic top view of a small CMOS pixel pitch/large MCP channel per unit area of the sensor surface according to the invention.

FIGS. 7A–7C illustrate three different alternatives of CMOS well/channel pitch relationships according to the invention. FIG. 7A illustrates one relationship between channel pitch 52a and a CMOS collection well 65'. In this case, channel pitch 52a is relatively small, while the size of CMOS well 65' is relatively large. This permits several electrons 47 from two or more channels 52 to strike CMOS collection well 65'. FIG. 7B illustrates another CMOS well/channel pitch relationship. In this embodiment, channel pitch 52a and the size of CMOS collection well 65' are approximately in a one-to-one relationship. As such electrons 47' from a single channel 52 strike a single collection well 65'. FIG. 7c illustrates another CMOS well/channel pitch relationship where channel pitch 52a is relatively large and the size of CMOS collection well 66 is relatively small. In this case electrons 47" from a single channel 52 strike multiple collection wells 66. While each of these structures provide various advantages, the relationship illustrated in FIG. 7A is preferred for the present invention.

As a result, the intensified hybrid solid-state sensor operates in different conditions than any of the other prior art concepts. The result is that the MCP 53 can be mounted directly on the CMOS sensor 56 giving the hybrid device similar contrast to the all solid-state device but with low halo, good signal-to-noise ratio, and logarithmic gain of the image tube. Since operating voltages are lower, the hybrid device can be gated like an image tube allowing operation from overcast starlight condition to daytime operation. The hybrid sensor has better halo from the lack of physical gap between MCP 53 and CMOS sensor 56. This lack of physical separation in the two components is also why contrast is improved when compared to the EBCCD/CMOS or image intensified camera. The hybrid device also has the logarithmic gain curve of the image tube. Unlike the EBCCD/CMOS sensor, the hybrid sensor can be gated due to the low cathode voltages.

The above detailed description of a preferred embodiment of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to lie within the scope and spirit of the invention as set forth in the following claims.

What is claimed is:
1. An intensified solid-state imaging sensor, comprising:
   a. a photo cathode having an input side for receiving light from an image, and an output side from which electrons produced by the photo cathode exit;
   b. a microchannel plate having an input surface positioned adjacent to the output surface of the photo cathode, an output surface from which an increased number of electrons exit, and a plurality of channels formed between the input surface and the output surface;
   c. a first electrical connection for applying a first biasing voltage between the photo cathode and the microchannel plate;
   d. a solid-state imaging device having an electron receiving surface, positioned adjacent to the output surface of the microchannel plate, for receiving the increased number of electrons output from the microchannel plate, and an output for outputting an intensified image signal;
   e. a second electrical connection for applying a second biasing voltage between the microchannel plate and the solid-state imaging sensor;
   f. a vacuum body holding the photo cathode, microchannel plate and solid-state imaging device together as a unit; and
   g. an insulating layer separating the output surface of the microchannel plate and the electron receiving surface of the solid-state imaging sensor.
2. An intensified solid-state imaging sensor according to claim 1, wherein the first biasing voltage is no more than about 2000V.
3. An intensified solid-state imaging sensor according to claim 1, wherein the second biasing voltage is no less than approximately 100V.
4. An intensified solid-state imaging sensor according to claim 1, wherein the solid-state imaging device is a CMOS imaging sensor.
5. An intensified solid-state imaging sensor according to claim 1, wherein the output surface of the microchannel plate and the electron receiving surface of the solid-state imaging sensor are at least in part in physical contact.
6. An intensified solid-state imaging sensor according to claim 1, wherein each of the plurality of channels has a substantially circular cross section.
7. An intensified solid-state imaging sensor according to claim 1, wherein each of the plurality of channels has a substantially square cross section.
8. An intensified solid-state imaging sensor according to claim 1, wherein the solid-state imaging device is a CCD.
9. An intensified solid-state imaging sensor according to claim 8, wherein the CCD is a back thinned charge-coupled device.
10. An intensified solid-state imaging sensor according to claim 8, wherein the CCD is a standard charge coupled device.
11. An intensified solid-state imaging sensor according to claim 1, wherein the insulting layer comprises a thin film deposited on one of either the electron receiving surface of the solid-state imaging device, or the output surface of the microchannel plate.
12. An intensified solid-state imaging sensor according to claim 11, wherein the thin film is no more than approximately 10 $\mu$m thick.
13. An intensified solid-state imaging sensor according to claim 1, wherein each of the plurality of channels in the microchannel plate has a predetermined width, and are separated by a predetermined pitch.
14. An intensified solid-state imaging sensor according to claim 13, wherein the solid-state imaging sensor comprises a plurality of collection wells of a predetermined size.
15. An intensified solid-state imaging sensor according to claim 14, wherein each of the plurality of channels is positioned relative to one of the plurality of collection wells so that electrons are emitted from the plurality of channels toward a predetermined number of collection wells.
16. An intensified solid-state imaging sensor according to claim 15, wherein the predetermined pitch, channel width, and collection well size are such that electrons emitted from two or more channels are received by a single collection well.
17. An intensified solid-state imaging sensor according to claim 15, wherein the predetermined pitch, channel width, and collection well size are such that electrons from one channel are received by a single collection well.
18. An intensified solid-state imaging sensor according to claim 15, wherein the predetermined pitch, channel width, and collection well size are such that electrons from one channel are received by a two or more collection wells.
19. An intensified solid-state imaging sensor, comprising:
   a. a photo cathode;
   b. a microchannel plate;
   c. a solid-state imaging sensor that receives electrons output from the microchannel plate and outputs an intensified image signal;
   d. an electric biasing circuit connected between the photo cathode, microchannel plate, and solid-state sensor;
   e. a vacuum body holding the photo cathode, microchannel plate, and solid-state imaging sensor in close physical proximity to one another; and
   f. an insulating layer separating an output surface of the microchannel plate and an electron receiving surface of the solid-state imaging sensor.
20. An intensified solid-state imaging sensor, comprising;
   a. a photo cathode to convert light from an image into electrons;

b. an electron multiplying device connected to an output surface of the photo cathode, the electron multiplying device being adapted to receive electrons from the photo cathode, increase the number of electrons received, and output the increased number of electrons;

c. a solid-state image sensor, further comprising:
   i. a plurality of collection wells connected to the electron multiplying device to receive the increased number of electrons output from the electron multiplying device and generate an intensified image signal; and
   ii. an output for outputting the intensified image signal to a display device;

d. an electrical circuit connected between the photo cathode and the solid-state image sensor to apply at least one biasing voltage there between;

e. a body in which the photo cathode, electron-multiplying device, and solid-state image sensor are held in at least a partial vacuum; and f. an insulating layer separating an output surface of the electron multiplying device and an electron receiving surface of the solid-state image sensor.

* * * * *